Sept. 17, 1968    R. C. CATLIN ETAL    3,402,378
ELECTRONIC CLINICAL THERMOMETER AND PROBE THEREFOR
Filed Sept. 10, 1965    2 Sheets-Sheet 1
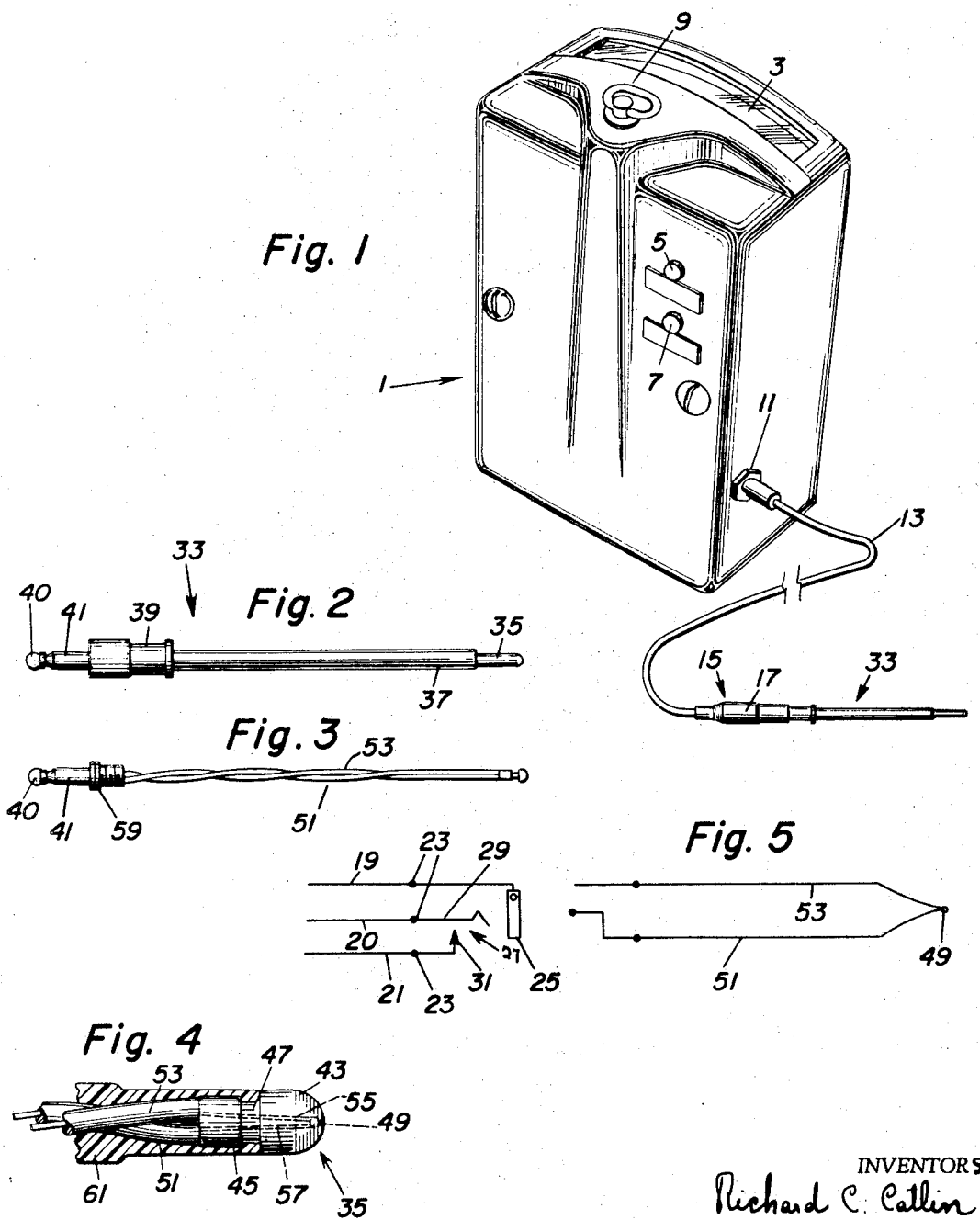
INVENTORS
Richard C. Catlin
Russell F. Shew
BY
Peck + Peck
ATTORNEYS Sept. 17, 1968    R. C. CATLIN ETAL    3,402,378
ELECTRONIC CLINICAL THERMOMETER AND PROBE THEREFOR
Filed Sept. 10, 1965    2 Sheets-Sheet 2

INVENTORS
Richard C. Catlin
Russell T. Shew
BY
Pech & Pech
ATTORNEYS

United States Patent Office 3,402,378
Patented Sept. 17, 1968

3,402,378
ELECTRONIC CLINICAL THERMOMETER AND
PROBE THEREFOR
Richard L. Catlin and Russell F. Shew, Silver Spring, Md.,
assignors to Aero-Med Thermal Instrument Company,
Inc., a corporation of the District of Columbia
Filed Sept. 10, 1965, Ser. No. 486,281
2 Claims. (Cl. 338—28)

ABSTRACT OF THE DISCLOSURE

A probe having a plastic coating and formed with a jack of electrically conductive material projecting from one end, and provided at the other end with a tip formed of plastic material in which is embedded a temperature sensitive resistor. The jack and temperature sensitive resistor being electrically connected together by leads, and the tip having a depression therein into which a part of the plastic coating extends to anchor the two together and the jack being removably attached to the probe, and a method of forming the probe.

---

This invention relates broadly to the art of temperature measuring and indicating means, and in its more specific aspects, it relates to an electonric clinical thermometer for use by medical personnel in the measurement and rapid indication of body temperature; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

Our invention involves an electronic thermometer and the apparatus for use therewith, and has been especially, though not exclusively, designed for use in hospitals, and the like, where a large number of temperature testings and measurements are made.

The apparatus of this invention consists generally of a meter, which is miniaturized and may comprise one of a variety of types which is capable of measuring small variations in resistance which will be brought about by the changes in the temperature being tested by our electronic thermometer. The meter, circuit, battery and other components of the meter which are necessary to the operation of the apparatus are housed in a casing, which is of small size, so that it may be conveniently carried in the pocket or around the neck by means of a neck strap, of the person who is using it. Thus, it will be appreciated that the miniaturization of the meter and its component parts is a highly desirable feature of our invention.

It has been our experience that many times the technician or other member of the medical personnel which is using an electronic thermometer inadvertently leaves the power on after taking a temperature reading, which obviously uselessly consumes the battery which powers the meter. This, obviously, is a relatively expensive and time consuming error.

It has been one of our prime objects to devise an electronic clinical thermometer which overcomes the above and other disadvantageous features of prior thermometers of this general type.

Our apparatus is highly advantageous due to the fact that we have so arranged the apparatus that a probe, i.e., that part of the apparatus which is inserted in a body cavity of the patient being tested, is easily electrically connected to and disconnected from the meter which is carried by the technician or the like so that the probe itself is left at the patient's bedside. In other words, each patient has his own probe, so that the member of the medical personnel who carries the meter, merely must go to each patient, insert the patient's probe into the meter circuit, take the reading and then disconnect the probe and leave it at the patient's bedside. It will be appreciated that such construction and operation is endowed with many inherent advantages. For instance, the individual probe may be individually cleansed, the technician need not take the time to sterilize the probe at each reading for this may be done to the patient's probe by someone else and at any convenient time. Substantial savings in time are achieved by this method, which we have briefly outlined above, but will describe in detail hereinafter.

Our apparatus provides a lead which extends outwardly from the housed meter, and we provide a socket switch on the end of this lead into which the end of the probe is inserted, whereby the circuit is automatically closed to the meter so that the temperature reading may be taken. Following the reading, the technician removes the probe from the switch on the end of the aforementioned meter lead, which operation automatically opens the circuit thereby assuring that the circuit will not be inadvertently left closed to thereby consume the meter battery. Upon completion of the reading and removal of the probe as described, the probe is left at the patient's bedside.

The probe of our invention provides a tip in which is mounted a wafer thermistor which is a temperature sensitive resistor having a negative temperature coefficient of resistance.

The probe, including the aforementioned resistor, is formed of a material which is capable of being sterilized by autoclaving, antiseptic solutions, soaps, non-toxic gases and the like without being damaged thereby. It is further formed of a material which will remain operative and not be damaged by hard and long usage and relatively rough handling.

One of the significant features of our invention resides in the novel and ingeneous manner we have devised for producing the probes, so that the tip and probe thereof will have the characteristics mentioned above, and whereby the tip will be securely attached to and form an integral part of the probe.

In a further form of our invention, we have devised a probe which has inherent ruggedness, and provides a construction whereby certain difficulties which may be met in a probe which is fully composed of plastic are overcome.

In yet a further form of our invention, we have provided novel and ingeneous means whereby the sleeve terminal of the probe is more easily and securely fastened to the plastic housing of the probe.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in perspective illustrating the entire electronic thermometer apparatus.

FIG. 2 is a view of the completed probe.

FIG. 3 is a view showing the condition of the probe body and the tip thereof prior to being finally attached together by any suitable plastic injection process.

FIG. 4 is a detailed view in section, with parts thereof broken away, showing the tip and its final connection with the body of the probe.

FIG. 5 is a diagrammatic showing of the electric circuit of the switch on the end of the lead from the housed meter.

Figure 6:
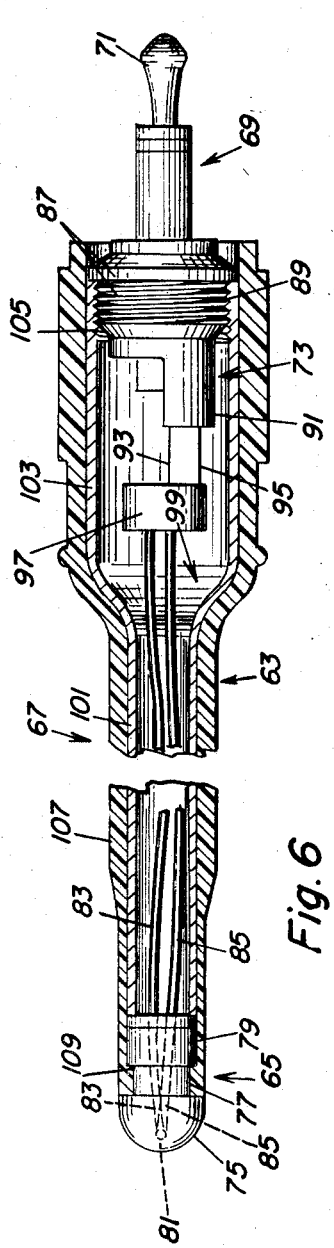
FIG. 6 is a view in section, with parts thereof broken away, of a further form of our probe.

In the accompanying drawings we have disclosed a casing, designated generally by the numeral 1, which houses the meter which is preferably, though not necessarily of the type which gives a temperature reading on its dial in degrees Fahrenheit. The casing 1 is provided with a face or dial 3, having a scale from which the readings are taken. The face may be lighted by a light bulb which is energized by button 5 by the user of the apparatus, and a test button 7 may be provided. As we have stated above, the meter is miniaturized so that the casing is of small size and may be conveniently carried in the pocket of the technician or around his neck by means of a neck strap which may be fastened in the eye 9 which is fixed to the top of the casing.

In the side of the casing, or in any other desirable and convenient location, a socket 11 is provided which is in electrical connection with the meter which is housed within the casing, this electrical connection being made in any manner which is well known and conventional in the art. Into this socket is plugged an electrical lead 13, which is of any suitable and convenient length, and is provided on its other or outer end with a socket switch which we have designated in its entirety by the numeral 15. The socket switch 15 may be of any suitable type, as is well known in the electrical arts, and, as an example, may comprise a generally elongated housing 17 into which the conductors 19, 20 and 21 from lead 13 extend and are fixed as at 23. As is particularly illustrated in FIG. 5 of the drawings, the outer end of the housing 17 is provided with a conducting ring 25, and the conductor 19 is electrically connected thereto. Within the aforesaid housing 17, we provide a switch generally indicated by the numeral 27, which consists of a movable element 29 which comprises an extension of conductor 20, and a fixed contact point 31 which comprises an extension of conductor 21. Thus, as will hereinafter be described and made clear, when movable element 29 is urged downwardly, it will make electrical contact with fixed contact 31 to complete the circuit to the housed meter to thereby take a temperature reading.

We have used the numeral 33 to designate in its entirety the probe of the electronic thermometer which, as has been explained, is separable from the lead 13 to the meter so that the probe may be left after a temperature reading at the bedside of the patient while the technician moves on with the casing housing the meter, and the lead 13 to the next patient for a temperature reading.

The probe consists of a tip 35, an elongated portion 37, a base 39 and a plug element 41, including center terminal 40 and sleeve terminal 59.

The tip 35 is formed in any suitable manner, preferably comprising a casting of epoxy resin having a high thermal conductivity for high temperature use, and is molded or otherwise formed of such resin to provide an end portion 43 which is of relatively large diameter with relation to the remaining part of the tip, a reduced diametrical portion 45 which is rearwardly spaced relative to the end portion 43, being spaced therefrom by a circumferential groove 47. It is to be recognized that the tip 35 is formed to provide an integral unit composed of end portion 43, groove 47 and inner portion 45, and disposed within the end portion 43 on the tip is a thermistor 49, which is preferably a wafer thermistor consituting a temperature sensitive resistor having a negative temperature coefficient of resistance.

Molded within the tip 35 are leads 51 and 53 which are electrically connected to the thermistor 49; the leads 51 and 53 are preferably nylon coated wire and may be twisted for ease of assembly, as especially illustrated in FIG. 3 of the drawings. The probe is assembled and formed into a unitary member by any suitable injection molding process, as will be explained and made clear hereinafter.

When the tip 35, with the thermistor positioned therein, as explained, the thermistor being connected to the leads 51 and 53, the lead 51 is electrically connected to the center terminal 40 and lead 53 is electrically connected to the sleeve terminal 59. With the various leads and conductors connected as described, the probe is formed in its final state by any suitable injection molding process to form a plastic coating 61 which extends from the collar 59 to the circumferential groove 47 in the tip 35 of the probe, to form a relatively rigid and rugged unitary probe. In the injection molding process it is desirable, though not necessary, to provide the enlarged base 39 for ease of handling of the probe in its connection to and removal from the switch on the end of the lead to the meter.

It will be appreciated from consideration of the drawings and from this description, that the plastic coating or sheath 61 provides, in effect, the medium which holds the various elements of the probe together to provide the unitary and integral structure, and this is realized and ensured by the provision in the tip 35 of the circumferential groove 47 into which the plastic sheath or coating 61 flows and is anchored so that the tip 35 is securely and permanently connected and fastened to the body of the probe and becomes a part thereof.

As we have stated above, the probe may be connected to and disconnected from the lead 13 from the meter by inserting the plug element 31 into the switch element 17 of the lead 13 to make the meter operable, and removing it therefrom to cut the current from the battery to the meter. The reasons and desirability of such construction have been made clear above. When the plug element is inserted into switch element 17 so that the meter will operate and a temperature reading may be taken, the center terminal 40 to which is electrically connected the lead 51, will engage wire 29 of the switch and depress it into electrical connection with fixed switch element 31, and the lead 53 being electrically connected to sleeve terminal 59, which, when the plug 41 is inserted in switch 17, comes into electrical connection with conducting ring 25 to thereby complete the electrical circuit so that a temperature reading may be taken by the technician. When the reading has been taken, the plug is removed from the switch and the circuit is broken and the meter is inoperative, and the probe is left at the patient's bedside. It will thus be appreciated that the closing of the circuit is automatic when the plug of the probe is inserted in the switch of the meter lead, and the opening of the circuit is also automatic when the probe plug is removed from the switch element on the end of the lead from the meter.

In FIG. 6 of the drawings, we have disclosed a modified form of our invention and have used the numeral 63 to designate the probe in its entirety. The probe consists of a tip designated generally by the numeral 65, an elongated portion designated in its entirety by the numeral 67, an electric plug element designated generally by the numeral 69 and such plug element includes a center terminal 71 and a sleeve terminal designated in its entirety by the numeral 73.

The tip 65 is generally similar to the tip 35 which has been particularly described and discussed in connection with FIG. 4 of the drawings, and is preferably formed of a casting of epoxy resin having a high thermal conductivity for high temperature use and includes an end portion 75, a reduced diametrical portion 77 and a rear portion 79 which is of greater diameter than the reduced portion 77 but is preferably of less diameter than the tip portion 75. It will thus be apparent that as in the earlier described form of our invention, the reduced diameter portion 77 provides a circumferential anchoring groove in the tip 65. We dispose a thermistor 81 in the end portion 75 of the tip 65, the thermistor preferably being a wafer thermistor constituting a temperature sensitive resistor having a negative temperature coefficient of resistance.

Leads 83 and 85 are molded within the tip 65 and are electrically connected to the thermistor 49, and extend rearwardly from and beyond the tip.

The sleeve terminal 73 of the electric plug element comprises a rearward body portion 87 which is externally threaded as at 89, and extending forwardly from said body portion 87 is a conduit like section 91 which receives the leads 93 and 95 which are connected to the leads 83 and 85 at a terminal box 97. The lead 93 is electrically connected to the center terminal 71, and the lead 95 is electrically connected to the sleeve terminal 73, the center terminal 71 and the sleeve terminal 73 are, of course, electrically discrete.

It is to be understood that the form of the invention illustrated in FIG. 6 of the drawings functions in the same manner as does the previously described form of the invention, for which the electric plug 69 is inserted in the electric switch element 15 of FIG. 1 of the drawings, the circuit to the meter is automatically closed, and when the plug element is removed from the switch element, the circuit is automatically opened.

We provide a tubular sleeve-like element, designated in its entirety, by the numeral 99, such tubular sleeve-like element being formed of any suitable, preferably light weight, metal. The metallic tubular element 99 comprises a reduced diameter portion 101, and a rearwardly diametrically enlarged portion 103, the two portions 101 and 103 preferably being integrally formed. At the rear end of the diametrically enlarged portion of the tubular sleeve 99, we provide interior threads 105.

After the tip 65 has been cast in any suitable manner with the thermistor and the leads 83 and 85 therein and extending rearwardly therefrom, such leads are threaded through the tubular sleeve 99 and are then soldered or otherwise electrically connected within the terminal box 97, then leads 93 and 95 are electrically fixed to center terminal 71 and sleeve terminal 73, respectively. When this assembly operation has been completed, the body portion 87 of the plug element 69 is threaded into the rear end of the enlarged diameter portion 103 of the tube 99 to thereby complete the assembly of the various elements with and in the tubular sleeve 99. In connection with this operation, it will be understood that the various leads are somewhat longer than the length of the tubular sleeve in order to facilitate the making of the necessary electric connections.

Following the above described assembly operation, a housing of a thermosetting plastic is formed on and about the tubular sleeve element 99, and also about the tip 65. Thus, such plastic which is molded about the tubular sleeve 99 forms a plastic casing or housing 107 for the probe, and it will be noted that the tip 65 is anchored to the probe by the anchoring extension of the plastic of the housing into the circumferential groove 77 as at 109.

It will be now appreciated that the probe as described in FIG. 6 of the drawings is one in which the components thereof may be assembled with ease, and the plastic outer coating or casing is provided with a base comprising the tubular sleeve-like metallic member 99. This construction and arrangement provides assurance that the plastic housing will be properly formed and will efficiently serve the function for which it has been designed.

Figure 7:
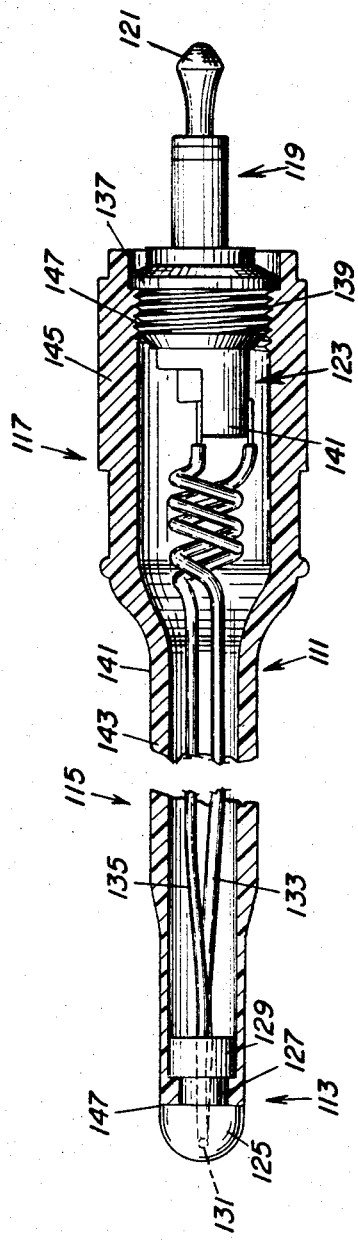
FIG. 7 is a view in section, with parts thereof broken away, of yet a further form which our invention may take.

In FIG. 7, we have disclosed a further form which our invention may take, and in this form of our invention, we have used the numeral 111 to describe the probe in its entirety. The probe consists of a tip designated generally by the numeral 113, an elongated body portion designated generally by the numeral 115, a rear end or hand hold portion designated in its entirety by the numeral 117, a plug element which we have assigned the numeral 119, and this plug element 119 includes a center terminal 121 and a sleeve terminal designated in its entirety by the numeral 123.

As in the two other forms of the invention which we have herein disclosed, the tip 113 is preferably a casting of epoxy resin having a high thermal conductivity for high temperature use and preferably comprises an end portion 125 and may provide the circumferential groove 127 and the rearward disposed portion 129.

It will be apparent as this description proceeds that in this form of our invention, it is not essential that the circumferential groove be provided; however, it is desirable that the rear portion 129 and the portion 127 be of reduced diameter relative to the diameter of the end portion 125. We mold within the tip portion 125 a thermistor 131 of the same type and having the same characteristics as the thermistors which have been hereinbefore described, and this thermistor is electrically connected to a pair of leads 133 and 135, the forward portions of which are molded within the resin tip of the probe.

The sleeve terminal 123, at the rear end thereof, is provided with a body portion 137 which is externally threaded as at 139, and an electric terminal portion 141 extends forwardly from said body portion. The lead 135 is electrically connected to the center terminal 121 while the lead 133 is connected to the sleeve terminal 123, the center terminal and the sleeve terminal being insulated from each other.

It is to be understood and fully recognized that, as in the other forms of our invention which we have described above, the plug element 119 automatically closes the circuit when it is inserted into the electrical switch element 15 as disclosed in FIG. 1 of the drawings, and the circuit is automatically opened when the plug element 119 is retracted therefrom. We provide a housing for the components of the probe which comprises a thermosetting plastic sleeve 141 which consists of a reduced elongated body portion 143 and a rearwardly extending diametrically enlarged hand hold portion 145, which at its rear end is provided with an internally threaded portion 147.

In the assembly of the device, the leads 133 and 135 which are molded in and extend from the resin tip having been electrically connected to the electric terminal 141, the threaded portion 139 is meshed with and threaded into the threads 147 which are provided in the hand hold section 145.

In this form of our invention, the tip 113 is not secured in its housing by the structure wherein the plastic housing extends in an anchoring manner into a circumferential groove; instead an epoxy or the like adhesive is applied to the forward end or edge of the plastic housing 141 and to the rear surface of the end 125 of the tip whereupon the tip is brought into tight abutting engagement as at 147 with the forward annular end of the plastic housing 141 so that a tight adhesive anchoring means is provided to maintain the tip in proper position with respect to the body of the probe.

We claim:

1. A probe for use with a clinical thermometer assembly and adapted to be inserted in a body cavity to provide a temperature reading, said probe comprising an elongated body having a tip projecting from one end thereof and plug projecting from the other end thereof, said tip having a temperature sensitive resistor embedded therein, and being provided with a depression therein, said plug being formed of an electrically conductive material, said temperature sensitive resistor and said plug being electrically connected, and said elongated body comprising a tubular metallic sleeve having a plastic coating extending about and covering said sleeve, and said coating extending into and being anchored in said depression, and said tubular metallic sleeve being open at both ends, and at one end is provided with an internally threaded portion, said plug being provided with an externally threaded portion meshable with said internally threaded portion for removable connection of said plug within said tubular metallic sleeve, and the other end of said sleeve being closed by said tip.

2. A method of forming a probe for use with a clinical thermometer assembly and adapted to be inserted in a body cavity to provide a temperature reading, comprising the steps of molding a tip of plastic material completely about a temperature sensitive resistor and the electric leads extending therefrom and outwardly with respect to said tip, connecting an electrically conductive element to the ends of the electrical leads which extend outwardly from said tip, inserting said electrically conducting element in one end of a tubular metallic sleeve with the electric leads therefrom to said tip extending through said sleeve, and inserting said tip in the other end of said sleeve and then molding a plastic material about said tubular metallic sleeve and a portion of said tip, and anchoring said plastic material to said tip.

References Cited

UNITED STATES PATENTS

| | | | |
|---|---|---|---|
| 2,753,714 | 7/1956 | Perkins et al. | 73—362 |
| 2,938,385 | 5/1960 | Mack et al. | 73—362 |
| 3,153,769 | 10/1964 | Moses | 73—362 |
| 3,165,929 | 1/1965 | Noller | 73—362 |
| 3,175,178 | 3/1965 | Boddy | 73—362 |
| 3,241,370 | 3/1966 | Mertler et al. | 73—362 |

FOREIGN PATENTS

| | | |
|---|---|---|
| 863,896 | 3/1961 | Great Britain. |

DAVID SCHONBERG, *Primary Examiner.*

FREDERICK SHOON, *Assistant Examiner.*